2,997,160
PACKAGE

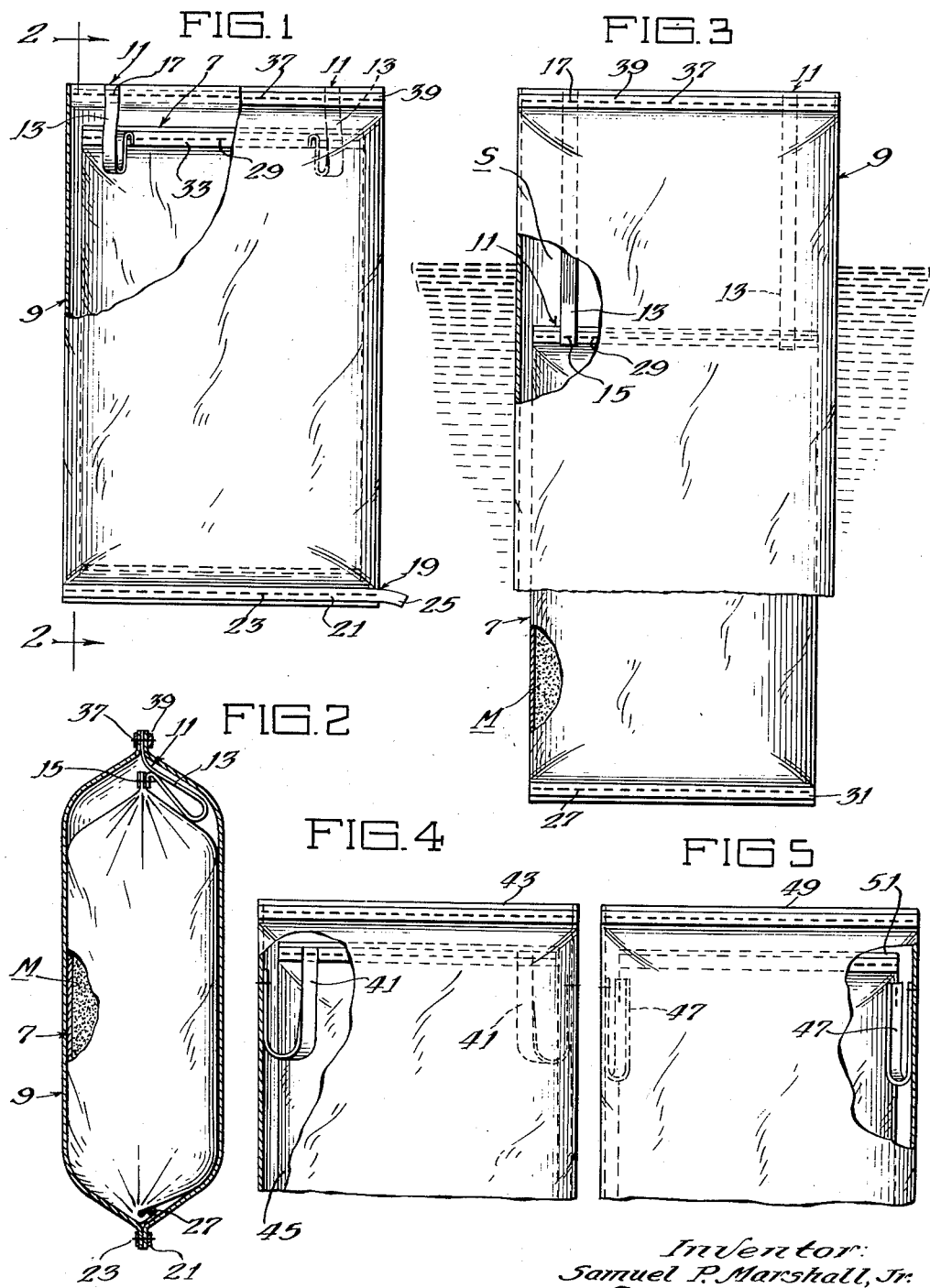

Samuel P. Marshall, Jr., Tupelo, Miss., assignor to International Minerals & Chemical Corporation, a corporation of New York
Filed Nov. 5, 1958, Ser. No. 772,015
4 Claims. (Cl. 206—.5)

The present invention generally relates to a package. More particularly it relates to a novel package which when in use may be floated on water. Specifically the invention relates to a package of fertilizer material which may be floated on fish ponds so as to fertilize the ponds.

One of the problems in meeting the needs of fertilizing fish ponds is getting the fertilizer dissolved in the upper twelve to fifteen inches of the lake or pond being treated. The fertilizer is needed in the upper water layer to promote the growth of plankton which is the floating animal and plant life of a body of water. If the fertilizer is placed around the banks, it tends to encourage the growth of moss and weeds which creates an undesirable growth. If the fertilizer is distributed out of a boat and scattered on the water, it goes to the bottom so fast that it does not get into solution in appreciable amounts in the upper layer where it is really needed.

A method previously used provides for a suitable horizontally disposed wood platform mounted on a vertical post so that the platform is approximately fifteen inches below the surface. The fertilizer is poured onto the platform and slowly dissolves off. This method has the disadvantage of requiring a large number of such platforms in a pond or lake of appreciable size.

The present invention provides a novel package which may be floated on water, enabling the fertilizer to dissolve in the upper water layer thus accomplishing maximum utilization of the fertilizer.

It is, accordingly, an object of the present invention to provide a novel package.

It is a further object of the present invention to provide a novel package which when in use may be floated on water.

Another object of the present invention is to provide a novel package of fertilizer material which may be floated on fish ponds and lakes thereby enabling the fertilizer to be dissolved in the upper water layer.

These and other objects and advantages of the present invention will be apparent from the following description and accompanying drawing which illustrate embodiments of the invention.

In the drawing:

FIGURE 1 is a front elevational view, partly broken away, of a package in accordance with the present invention;

FIGURE 2 is a sectional view, partly broken away, taken along line 2—2 of FIGURE 1;

FIGURE 3 is a front elevational view, partly broken away, illustrating how an open package in accordance with the present invention floats in a body of water;

FIGURE 4 is a partial front elevational view, partly broken away, illustrating another embodiment of the invention; and FIGURE 5 also is a partial front elevational view, partly broken away, illustrating still another embodiment of the invention.

The present invention provides a package for packaging granular materials such as fertilizers, chemicals, grains, etc. The apparatus of the present invention provides a unique bag-within-a-bag type of package with means provided to permit only partial withdrawal of the inner bag from the outer bag.

The package of the present invention provides a means for opening the outer bag at one end so as to permit the inner bag to extend out of the outer bag. When the inner bag is partially withdrawn from the outer bag, there exists an air pocket in the space the inner bag occupied prior to its partial withdrawal from the outer bag. The air pocket provides the necessary buoyancy for floating the package and its contents.

The preferable means for permitting only partial withdrawal fo the inner bag from the outer bag comprises at least one strap, web, or strip of suitable material of predetermined length which connects the inner bag and the outer bag.

The use of the package of the present invention makes possible the floating of fertilizer on a fish pond so as to efficiently fertilize the upper layer of water with a minimum of difficulty.

An embodiment of the package of the present invention is shown in the drawing and is described in the following paragraph. While the package shown in the drawing is specifically adapted to the packaging of fertilizers, it will be understood that the package may be used for the packaging of other products with equal facility.

As will hereinafter become apparent, the package shown in the drawing includes, generally, an inner bag 7 and an outer bag 9, with means 11 connecting the inner bag and the outer bag. The material to be packaged, indicated as M in FIGURES 2 and 3, is packaged in the inner bag. The means 11 connecting the inner bag 7 and the outer bag 9 includes a pair of webs 13. Each web is attached to the inner bag 7 by a suitable means such as by stitching indicated at 15. Each web is also attached to the outer bag 9 by suitable means such as by stitching indicated at 17. The webs 13 are of a predetermined length so as to permit partial, but not complete withdrawal of the inner bag 7 from the outer bag 9.

The package is provided with a means 19 for opening the outer bag 9. The means 19, illustrated, includes a conventional tear strip 21 which is stitched along one edge of the bag by stitching indicated at 23. An extension of the tear strip provides a tab 25 extending out from the outer bag 9 and serves as a hand grip member to facilitate the tearing off of the tear strip 21 and the portion of the outer bag to which the tear strip is attached, thereby opening the bag.

With the end of the outer bag 9 opened, the inner bag 7 may be withdrawn from the outer bag 9 until the webs 13 become taut and stop hte withdrawal. The package is now in the condition illustrated in FIG. 3. With the package in this condition, an air space, designated by S, exists in the space previously occupied by the inner bag 7. The air space or pocket S provides the necessary buoyancy so that the package may be floated on water as illustrated in FIG. 3.

Referring now more particularly to the drawing, the specific package, illustrated, embodies various of the features of the invention and, as has been pointed out, is particularly adapted to the packaging of fish pond fertilizer. The illustrated package includes an inner bag 7 which may be of conventional design as is illustrated. The inner bag 7 is closed at its lower end by stitching as indicated at 27 and is also closed at its upper end by stitching as indicated at 29. Conventional reinforcing webs 31 and 33 at the lower and upper ends of the bag respectively, are provided to strengthen the stitching. Since the package is designed to float on water, the inner bag 7 is preferably of a material which has a suitable wet strength so that the material M placed in the inner bag will not break through the walls of the bag. The material from which the inner bag is constructed may be water pervious so as to permit water to enter into the inner bag to dissolve the fertilizer and so as to permit the solubilized fertilizer ingredients to pass out through the walls of the bag. Suitable materials are porous papers, cloth such as burlap, etc. In some instances the fertilizer material M is of such a nature that evaporation or sublimation losses would be encountered if a porous bag were used. When packaging such fertilizer materials a plastic lined, air and water impervious bag is preferably used and holes are cut or punched in the inner bag to permit the fertilizer to dissolve in the water when the package is being used as is hereinafter explained in greater detail. The material M to be packaged is placed in the inner bag before the bag is sealed.

The outer bag 9, like the inner bag 7, may be of somewhat conventional design and construction as is illustrated. The outer bag 9 is larger than the inner bag 7 so that the inner bag may be completely placed within the outer bag. The inner bag, when filled, may be of a size so that its walls engage the inside walls of the outer bag, thereby providing a frictional fit so that the inner bag may telescopically slide into or out of the outer bag. The inner bag may also be of substantially smaller size than the outer bag so that the inner bag fits loosely within the outer bag.

The lower end of the outer bag 9 is stitched closed by stitching 23. The stitching 23 is also over the tear strip 21; however, separate stitching may, of course, be used to stitch the bag shut and to fasten the tear strip. The upper end of the outer bag 9 is also closed by stitching 37 and a conventional reinforcing web 39 is provided to strengthen the stitching. The stitching and material from which the outer bag is fabricated preferably have high wet strength and the construction should also be such that the upper portion of the outer bag 9 is air impervious so as to prevent the air in the air space S from escaping.

In the embodiment illustrated in FIGURES 1, 2, and 3, the means 11 connecting the inner bag 7 and the outer bag 9 includes a pair of webs 13. Each web 13 is attached to the top portion of the inner bag 7 by stitching 15. Each web 13 is also attached to the top portion of the outer bag 9 by stitching 17. Each web 13 is outside of the inner bag and is inside of the outer bag. The webs are preferably of a material which has sufficient strength to hold the weight of the inner bag and the selected material should also have this strength when wet. The webs are of substantially the same length and each web is of a predetermined length to permit the bag to be partially, but not completely withdrawn from the bag. The webs must, however, be at least long enough to permit withdrawal of the inner bag from the outer bag, a sufficient and predetermined amount so that the air pocket S is of sufficient size to float the package on water. In general, the webs should permit at least one-third of the inner bag 7 to be withdrawn from the outer bag 9.

The webs 13 may be attached to the bags, 7 and 9, in various ways. Referring to the embodiment illustrated in FIG. 4, there is shown a pair of webs 41 which are attached to an outer bag 43 and an inner bag 45. The webs are attached to an upper side portion of the outer bag 43 and to the top portion of the inner bag 45.

Referring to the embodiment illustrated in FIG. 5, there is shown a pair of webs 47 which are attached to an outer bag 49 and in inner bag 51. The webs are attached to an upper side portion of the outer bag 49 and an upper side portion of the inner bag.

When the bag is to be floated on a body of water, the hand grip portion 25 of the tear strip 21 is grasped and the outer bag 9 is opened by tearing the tear strip 21 off of the bag 9. The inner bag 7 is then permitted to slide or drop out of the outer bag 9 until the webs 13 are drawn taut. The package is then placed on the water in the position illustrated in FIGURE 3 and the package is permitted to float around on the body of water or the package may be pushed or pulled along the surface when desired. To aid in contacting the fertilizer with the water, holes (not illustrated) may be punched in the sides of the inner bag.

The description of the invention utilized specific reference to certain construction details; however, it is to be understood that such details are illustrative only and not by way of limitation. For example, in the illustrated embodiments a pair of webs was described. A pair of webs is preferred; however, one, three or more webs may be used. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A package for buoyantly suspending a fertilizer material at a predetermined position beneath the surface of a body of water comprising a closed outer bag having at least the upper portion thereof substantially air impervious to provide an air entrapping pocket in said upper portion for buoyantly supporting said package when immersed in a body of water, a tear strip for opening said outer bag at the end of said outer bag opposite said upper portion, a closed inner bag containing fertilizer material within said outer bag, at least one web connected to an upper portion of said outer bag and the other end connected to an upper portion of said inner bag to dispose said web within said outer bag and exteriorly of said inner bag, said web having a length providing slack between the closed bags to permit only partial withdrawal of said inner bag from said outer bag upon opening of said outer bag.

2. A package as recited in claim 1 wherein the length of said web provides slack permitting at least one-third and less than complete withdrawal of said inner bag from said outer bag.

3. A package for buoyantly suspending a fertilizer material at a predetermined position beneath the surface of a body of water comprising a closed outer bag having at least the upper portion thereof substantially air impervious to provide an air entrapping pocket in said upper portion for buoyantly supporting said package when immersed in a body of water, a closed inner bag containing fertilizer material within said outer bag, said inner bag being independent of said outer bag to be freely movable into and out of said outer bag upon opening of the lower end of said outer bag, said lower end being substantially opposite said upper portion of said outer bag, elongated retainer means having one end connected to said outer bag to extend inwardly of the interior of said outer bag and its opposite end connected to said inner bag to extend outwardly of the exterior of said inner bag, said retainer means having a length providing slack between the closed bags and retaining the inner bag against complete withdrawal from the outer bag when the lower end of said outer bag is opened.

4. A package as recited in claim 3 wherein said lower end of said outer bag is provided with a tear strip for opening said outer bag.

References Cited in the file of this patent

UNITED STATES PATENTS

| 2,406,660 | Brady | Aug. 27, 1946 |
| 2,432,968 | Lahey | Dec. 16, 1947 |
| 2,860,989 | Geisinger | Nov. 18, 1958 |